Feb. 5, 1924.
A. D. WACK
1,483,026
RESILIENT SPRING WHEEL
Original Filed Dec. 9, 1920   3 Sheets-Sheet 3
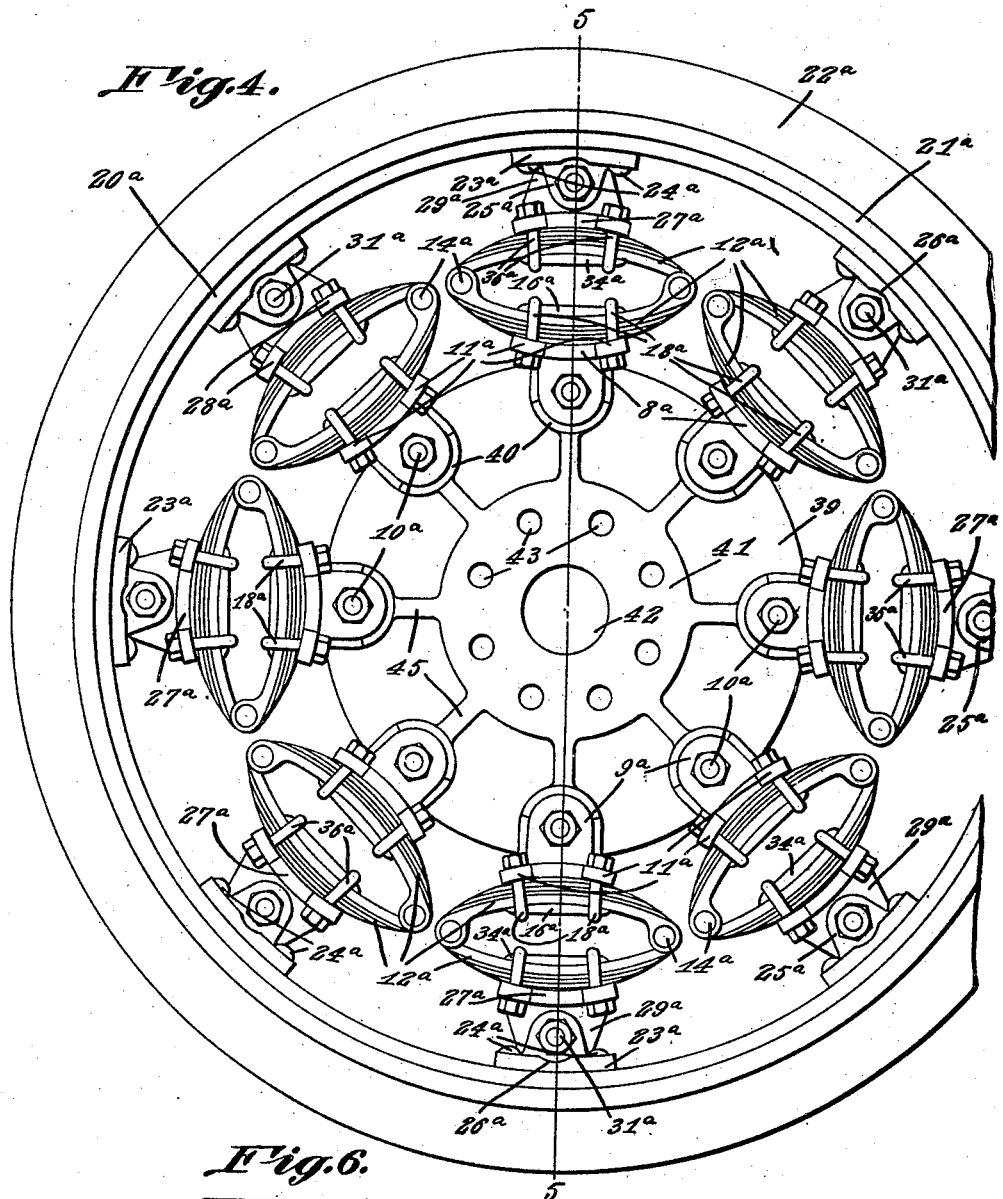
Fig.4.
Fig.6.
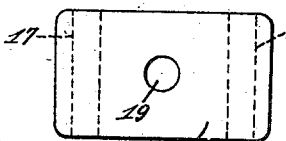
A.D.Wack, Inventor
Witness
By C.A.Snow & Co.
Attorneys Patented Feb. 5, 1924.

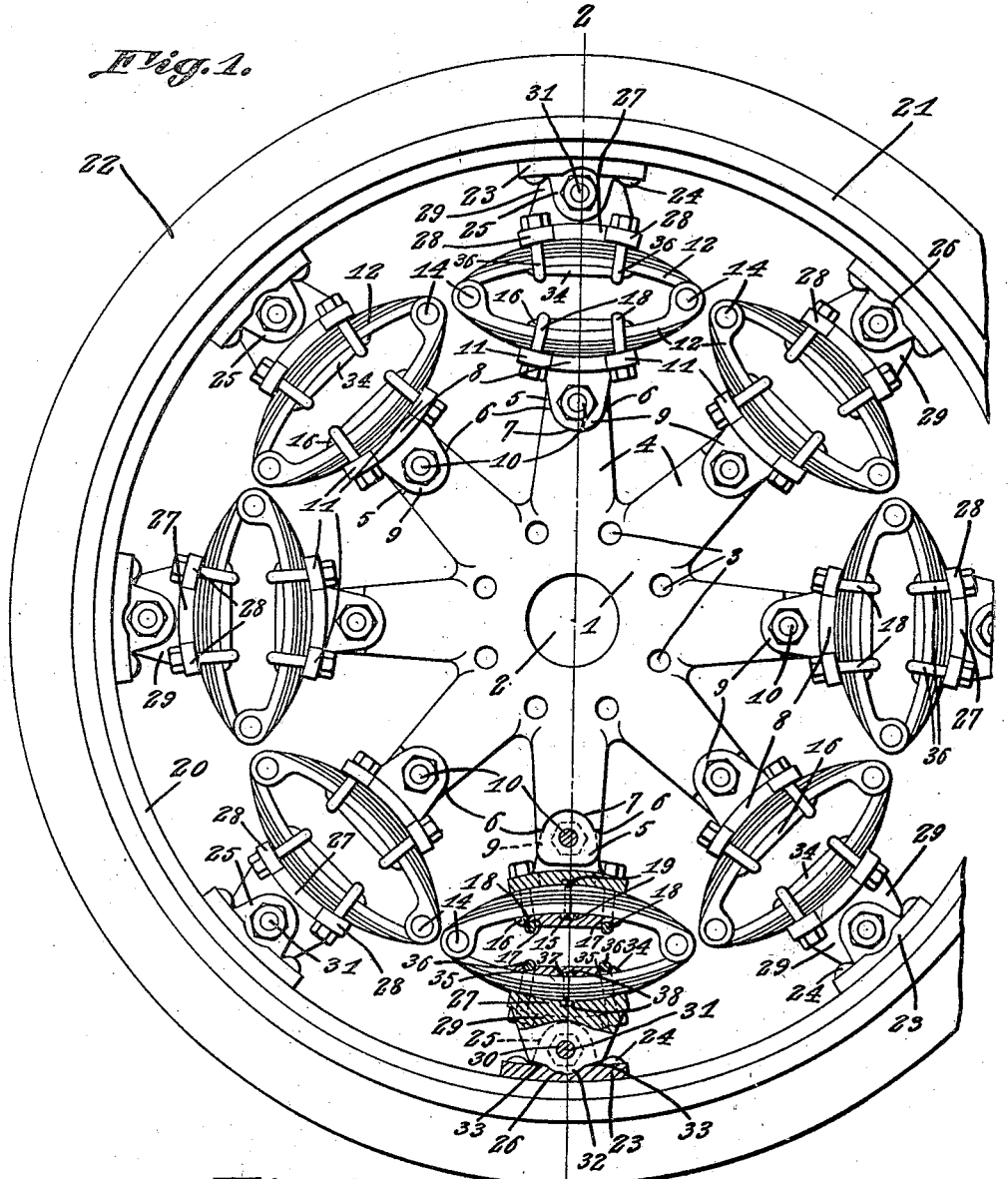

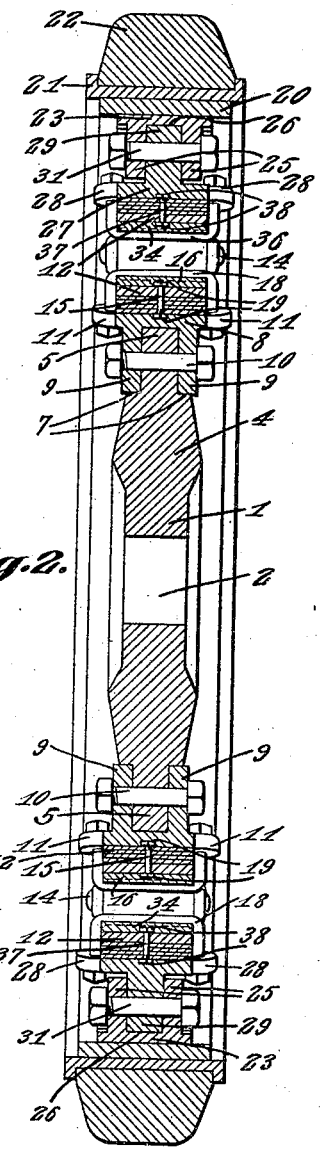

1,483,026

UNITED STATES PATENT OFFICE.

ARTHUR DARBY WACK, OF ST. LOUIS, MISSOURI, ASSIGNOR TO GIANT RESILIENT WHEEL COMPANY, OF ST. LOUIS, MISSOURI, A CORPORATION.

RESILIENT SPRING WHEEL.

Application filed December 9, 1920, Serial No. 429,490. Renewed November 26, 1923.

*To all whom it may concern:*

Be it known that I, ARTHUR DARBY WACK, a citizen of the United States, residing at St. Louis, in the county of St. Louis City and State of Missouri, have invented a new and useful Resilient Spring Wheel, of which the following is a specification.

It is the object of this invention to provide an unusually strong and well designed wheel adapted for use on railroad cars, locomotives, automobile tractors, army tanks, aeroplanes, automobiles and vehicles of every description, novel means being provided whereby the necessary resiliency will be afforded, and the construction being such that the springs may have a rocking movement, within limits, without causing undue friction. The invention aims to provide a wheel of the kind mentioned which, when used on an automobile, may be employed in connection with a solid tire not subject to puncture, it being possible to use the device on an engine or railroad car, thereby reducing shocks and jars and lengthening the life of the engine or car accordingly. The invention aims to provide novel means whereby the full resiliency of elliptical springs will be obtained. The invention contemplates a wheel in which great strength, particularly so far as resisting lateral movement is concerned is present.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a wheel constructed in accordance with the invention; Figure 2 is a section on the line 2—2 of Figure 1; Figure 3 is a side elevation showing one of the brackets; Figure 4 is a side elevation showing a modified form of the invention; Figure 5 is a section on the line 5—5 of Figure 4; and Figure 6 is a plan showing one of the clips.

In carrying out the invention as disclosed in Figures 1, 2, 3, and 6, there is provided a main member including a hub 1 having a central opening 2 and supplied, if desired, with openings 3, adapting the hub for connection with a brake drum or any other object. Spokes 4 are formed integrally with the hub 1 and radiate therefrom. At their outer ends, the spokes 4 are reduced in thickness to form tongues 5 and to fashion a shoulder 6 on each side of the tongue 5, there being concaved recesses 7 in the shoulders.

Brackets 8 are provided, the brackets having wings 9 between which the tongues 5 of the spokes are received, securing elements 10 passing through the wings 9 and the tongues, the ends of the wings being received in the recesses 7 of the spokes 4. The brackets 8 have lateral ears 11. The inner portions of double convexed leaf springs 12 rest on the brackets 8, the ends of the inner and outer leaves of the springs 12 being connected by pivot elements 14, in the well known way. Securing devices 15 pass through the inner leaves of the springs 12 and hold them together. Clips 16 cooperate with the inner leaves of the springs 12 and are provided with transverse grooves 17 receiving U-bolts 18 mounted in the ears 11 of the brackets 8. The clips 16 and the body portions of the brackets 8 are provided with recesses 19 receiving the ends of the securing devices 15 which unite the inner leaves of the springs 12.

A wheel body is provided, and the same may be constructed as desired. The wheel body may comprise a felly band 20 carrying a rim 21 supplied with a tire 22 of any desired sort. Supports 23 are united by securing elements 24 with the felly band 20, each support having ears 25, there being concaved recesses 26 in the body portions of the supports, between the ears 25. Brackets 27 are supplied, the same having projections 28. A web 29 extends from the body portion of each bracket 27 and is provided with an opening 30 adapted to receive a pivot element 31 mounted in the ears 25. The web 29 has a projection 32 mounted to rock in the recess 26 and serving to take much of the strain off the pivot element 31. The web 29 of the bracket 27 is beveled at 33, or inclined, on opposite sides of the projection 32. The construction is such that the bracket 27 can rock to a limited extent on the pivot element 31, but, ultimately, the inclined edges 33 come into contact with the base portion of the support 23 on the wheel body, and thus the rocking movement of the bracket, circumferentially of the wheel is limited. A clip 34 cooperates with the outer leaves of the spring 12 and has transverse grooves 35 receiving U-bolts 36 mounted in the parts 28 of the bracket 27. Obviously, the limited rocking movement of the bracket 27 on the wheel body as hereinbefore described, makes the springs 12 yield to a limited extent, circumferentially of the wheel, but when the edges 33 of the web 29 of the bracket 27 come into contact with the base portion of the support 23, then the yielding of the springs 12, circumferentially of the wheel is limited. The outer leaves of the spring 12 are connected by a securing member 37 and there are recesses 38 in the clip 34 and in the bracket 27, which receive the ends of the securing member.

The wheel above described permits the use of elliptical or double convexed springs and permits a limited movement of said springs circumferentially of the wheel. The structure is strong, compact and well fitted to exercise the functions to be expected of a wheel of the kind described.

In the modified form shown in Figures 4 and 5, parts hereinbefore described are designated by numerals previously used, with the suffix "a." In this form, the modification consists, essentially, in forming the main member of the wheel in the form of a disk provided adjacent its periphery and on its sides with U-shaped ribs 40, the disk having a thickened hub 41 provided with a central opening 42 and with openings 43 corresponding to the openings 3 of Figure 1. Reinforcing ridges 45 connect the parts 40 and 41 and are fashioned integrally with the disk 39. As indicated at 44 in Figure 5, the disk 39 is thickened at its periphery within the ribs 40, the part 44 being received between the elements 9ª of Figure 5 and being mounted on the pivot member 10ª.

Having thus described the invention, what is claimed is:—

A device for use in the making of a spring wheel, comprising symmetrical elliptical leaf springs each including inner and outer members; securing devices connecting the leaves of the inner and outer members; clips cooperating with the inner surfaces of the inner and outer members, brackets cooperating with the outer surfaces of the inner members, and brackets cooperating with the outer surfaces of the outer members, the brackets and the clips having recesses receiving the ends of the securing elements, the first specified brackets having wings, and the last specified brackets having webs, each web including an intermediate bearing projection, and being supplied with inclined stop edges located on opposite sides of the bearing projection; pivot elements mounted in the brackets; and U-shaped connectors detachably assembled with the brackets and extended about the inner and outer members of the springs and about the clips, the clips having grooves for the reception of the connectors.

In testimony that I claim the foregoing as my own, I have hereto affixed my signature in the presence of two witnesses.

ARTHUR DARBY WACK.

Witnesses:
 EUDA WILSON,
 L. A. NEWTON.